US007522053B2

(12) United States Patent  (10) Patent No.: US 7,522,053 B2
Johnson et al.  (45) Date of Patent: Apr. 21, 2009

(54) METHOD AND APPARATUS FOR PREVENTING LUGGAGE MISHANDLING IN PUBLIC TRANSPORTATION SYSTEMS

(75) Inventors: Jeffrey Douglas Johnson, 1 Heritage Drive, Mt Nathan, Queensland (AU) 4211; Gene Allen Corle, Farwell, MN (US)

(73) Assignee: Jeffrey Douglas Johnson, Queensland (AU)

( * ) Notice: Subject to any disclaimer, the term of this patent is extended or adjusted under 35 U.S.C. 154(b) by 331 days.

(21) Appl. No.: 11/559,883

(22) Filed: Nov. 14, 2006

(65) Prior Publication Data

US 2007/0109127 A1  May 17, 2007

Related U.S. Application Data

(60) Provisional application No. 60/736,427, filed on Nov. 14, 2005.

(51) Int. Cl.
   *G08B 13/14*  (2006.01)
(52) U.S. Cl. .................. 340/572.1; 340/572.9; 53/449; 53/461
(58) Field of Classification Search ............. 340/572.1, 340/572.4, 572.8, 572.9, 568.1, 571, 5.3, 340/5.31, 5.32; 283/80; 53/449, 411, 442, 53/399, 463, 466, 461; 156/277, 566
See application file for complete search history.

(56) References Cited

U.S. PATENT DOCUMENTS

| 3,752,312 | A |   | 8/1973  | Soltanoff |
| 3,815,313 | A |   | 6/1974  | Heisler |
| 4,065,343 | A | * | 12/1977 | Stumpe ..................... 156/212 |
| 4,783,950 | A | * | 11/1988 | Santagati ..................... 53/463 |
| 5,299,406 | A |   | 4/1994  | Laury |
| 5,440,102 | A |   | 8/1995  | Pena |
| 5,451,282 | A | * | 9/1995  | Fore ........................... 156/212 |
| 5,531,059 | A |   | 7/1996  | Dickinson |
| 5,784,864 | A |   | 7/1998  | Laury |

(Continued)

FOREIGN PATENT DOCUMENTS

DE  10336721  3/2005

(Continued)

*Primary Examiner*—Toan N Pham
(74) *Attorney, Agent, or Firm*—Charles F. Reidelbach, Jr., Esq.

(57) ABSTRACT

A method of protecting luggage from tampering includes steps of receiving a piece of luggage at a baggage check-in station (1302), and encoding passenger and routing information at the baggage check-in station onto an identification tag (1304). The identification tag is attached to the piece of luggage (1306). The piece of luggage is placed on a baggage conveyor and conveyed to a security inspection station inside a secure area that excludes all unauthorized s personnel (1308). The piece of luggage is conveyed on the baggage conveyor to a scanning station to detect and decode the passenger and routing information on the identification tag (1310). The piece of luggage is conveyed on the baggage conveyor to a wrapping station (1312). When an identification tag is detected, the method continues from step (1316), otherwise from step (1322). When the identification tag indicates that the piece of luggage is to be wrapped, the method continues from step (1320), otherwise from step (1322). The piece of luggage is wrapped automatically (1320). The piece of luggage is conveyed through the wrapping station to a baggage receiving station (1322).

23 Claims, 9 Drawing Sheets

U.S. PATENT DOCUMENTS

| | | | |
|---|---|---|---|
| 5,890,345 A * | 4/1999 | Bauer | 53/449 |
| 6,691,496 B2 | 2/2004 | Pena | |
| 6,761,014 B2 | 7/2004 | Cerf | |
| 6,967,579 B1 | 11/2005 | Elizondo | |
| 2003/0189094 A1 | 10/2003 | Trabitz | |
| 2008/0088125 A1 * | 4/2008 | Montross | 283/80 |

FOREIGN PATENT DOCUMENTS

| | | |
|---|---|---|
| FR | 2702742 | 9/1994 |
| FR | 2712565 | 5/1995 |
| FR | 2718708 | 10/1995 |

* cited by examiner

METHOD AND APPARATUS FOR PREVENTING LUGGAGE MISHANDLING IN PUBLIC TRANSPORTATION SYSTEMS

CROSS-REFERENCE TO RELATED APPLICATIONS

This application claims the benefit of Provisional Application No. 60/736,427, filed Nov. 14, 2005, incorporated herein in its entirety.

BACKGROUND OF THE INVENTION

1. Field of the Invention

The present invention is directed to security procedures used to screen luggage in public transportation systems such as airlines, trains, buses, and ships. More specifically, but without limitation thereto, the present invention is directed to a device for protecting luggage from tampering and mishandling in public transportation systems.

2. Description of Related Art

Transportation security is an extremely critical and sensitive issue that especially affects the airline industry. The global travel and tourism industry relies heavily on the confidence of the traveling public in the security and safety measures taken by the airlines. With the advent of global terrorism, random and indiscriminate acts of terror are often directed at aircraft. As a result, increasingly sophisticated techniques must be developed to thwart the capability of terrorists to target and infiltrate aviation security.

The devastating attack of Sep. 11, 2001 demonstrated how determined and resourceful terrorists and corrupt organizations may be in infiltrating the airline industry from within and in circumventing public security screening procedures, and it was that attack that became a catalyst for enhanced aviation security procedures. However, it was the in-flight bombing of Pan American Flight 103 over Lockerbie, Scotland in 1988 that brought about the new generation security profile. Failures in the previous security procedures allowed an undetected and unaccompanied checked bag to be transferred to Flight 103.

Another serious problem in the transportation security industry is baggage mishandling that not only allows terrorists to insert dangerous goods such as explosives or chemicals into luggage, but also allows corrupt employees to remove items from luggage. The term mishandling includes baggage tampering, which is the opening of luggage by airline and airport employees or other employees entrusted with the luggage. In addition to the threat of terrorism, baggage tampering is a significant financial burden and inconvenience for travelers and insurance companies and also damages the reputation and income of airlines, airports, and tourist destinations. Passengers are justifiably concerned about the possibility of being arrested and detained in foreign prisons for life or even sentenced to death as a result of detection of illegal drugs or other contraband found in their luggage with no way of proving that the illegal items were placed in the luggage without the knowledge of the passengers.

Another problem with existing baggage handling systems is misdirected baggage. Misdirected baggage results from misreading International Air Transportation Association (IATA) tags by barcode scanners, because the IATA tags are damaged, because the barcodes are obscured, or because of human error from reading the small print on the IATA tag. Misdirected baggage costs airlines millions of dollars each year.

Investigations by law enforcement, federal security agencies, airline security organizations, and journalists have uncovered a plethora of corruption and failings within the baggage handling environment, including convicted drug dealers, drug cartel members, corrupt security staff and suspected members of extremist organizations working at major international airports and airlines. Preliminary investigations have only begun to uncover these problems as further probing and background checks are conducted on thousands of airline and airport employees.

SUMMARY OF THE INVENTION

In one embodiment, a method of protecting luggage from tampering includes the following steps:
  (a) receiving a piece of luggage at a baggage check-in station;
  (b) encoding passenger and routing information at the baggage check-in station onto an identification tag;
  (c) attaching the identification tag to the piece of luggage;
  (d) placing the piece of luggage on a baggage conveyor and conveying the piece of luggage to a security inspection station inside a secure area that excludes all unauthorized personnel;
  (e) conveying the piece of luggage on the baggage conveyor to a scanning station to detect and decode the identification tag;
  (f) conveying the piece of luggage on the baggage conveyor to a wrapping station;
  (g) when an identification tag is detected, continuing from step (h), else continuing from step (j);
  (h) when the identification tag indicates that the piece of luggage is to be wrapped, continuing from step (i), else continuing from step (j);
  (i) wrapping the piece of luggage automatically; and
  (j) conveying the piece of luggage through the wrapping station to a baggage receiving station.

In another embodiment, an apparatus for avoiding tampering of luggage includes:
  a tag encoder unit for recording passenger and routing information onto an identification tag and for dispensing the identification tag for attaching to a piece of luggage at a baggage check-in station;
  a baggage conveyor for receiving the piece of luggage at the baggage check-in station and for conveying the piece of luggage from the baggage check-in station through a secure area that excludes all unauthorized personnel;
  a scanning station for scanning the piece of luggage to detect and decode the identification tag and to measure dimensions of the piece of luggage; and
  a wrapping station for wrapping the piece of luggage automatically and for conveying the piece of luggage through the wrapping station without wrapping the piece of luggage.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings, and wherein.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order to be performed. However, practitioners of the art will understand that the specific order is only given by way of example and that the specific order does not exclude performing the described steps in another order to achieve substantially the same result. Also, the terms and expressions used in the description have the ordinary meanings accorded to such terms and expressions in the corresponding respective areas of inquiry and study except where other meanings have been specifically set forth herein.

Shrinkwrap is a common device used to protect smaller articles of merchandise from damage and tampering; however, items as large as a piece of luggage are generally packaged in cardboard boxes or left unpackaged. Also, automatic shrinkwrapping machines are generally designed to wrap articles having the same size rather than articles of many different sizes and shapes. An automatic luggage wrapping machine preferably can accommodate a wide range of sizes and be able to wrap, for example, up to 20 pieces of luggage a minute to keep pace with existing baggage handling systems.

Figure 1:
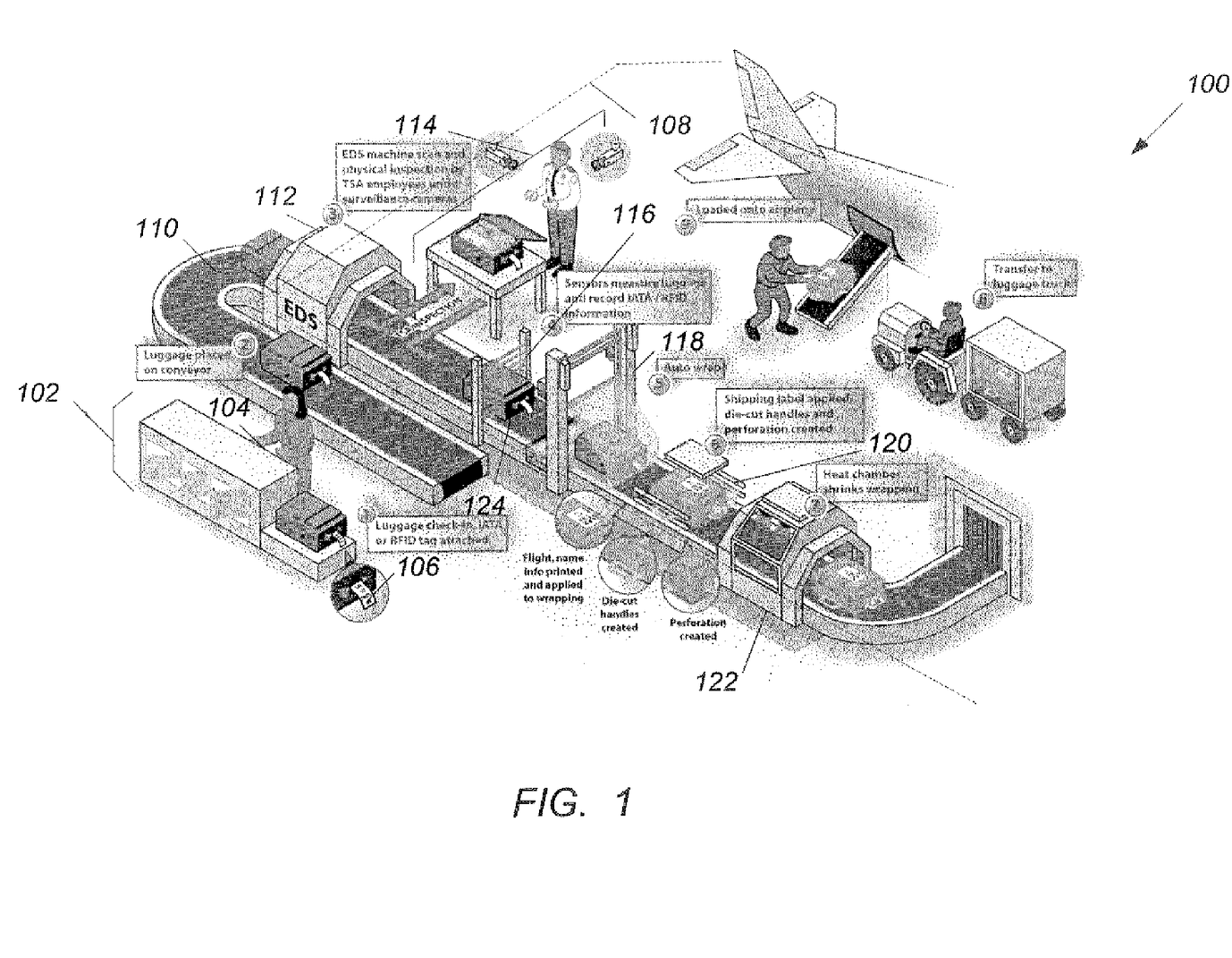
FIG. 1 illustrates a baggage security system integrated into an airport baggage handling system.

FIG. 1 illustrates a diagram 100 of a baggage security system integrated into an airport baggage handling system. Shown in FIG. 1 are a baggage check-in station 102, a Radio Frequency Identification (RFID) encoder unit 104, an RFID tag 106, a secure area 108, a baggage conveyor 110, an explosive detection system 112, a baggage inspection station 114, a scanning station 116, a wrapping station 118, a sealing station 120, a heating station 122, and a piece of luggage 124.

In the arrangement of FIG. 1, the scanning station 116, the wrapping station 118, the sealing station 120, and the heat shrink station 122 are integrated into an existing airport baggage handling system, for example, by attaching each of the stations to an airline baggage conveyor. Alternatively, the scanning station 116, the wrapping station 118, the sealing station 120, and the heat shrink station 122 each include a separate section of the baggage conveyor 110 that replaces one or more sections of an existing baggage conveyor used by the airport baggage handling system. The RFID encoder unit 104, the scanning station 116, the wrapping station 118, the sealing section 120, and the heat shrink station 122 may be modified and configured independently in a variety of different implementations depending on the present processes and existing baggage handling systems used in airports worldwide.

The piece of luggage 124, which is representative of every article checked in at the baggage check-in station 102, is checked in at the baggage check-in station 102. Passenger and baggage routing information is encoded from the air carrier's baggage handling computer onto an RFID tag. The RFID tag 106 may be dispensed from a roll of RFID tags inside the RFID encoder unit 104. In one embodiment, the passenger and baggage routing information is simultaneously captured as the information is printed on the IATA baggage claim tag. Alternatively, other identification tags may be used instead of or in conjunction with the RFID tag 106, such as an IATA baggage claim tag. For example, an RFID chip may be placed inside the adhesive side of an IATA baggage claim tag. An advantage of the RFID tag 106 is that it may be read much more reliably than barcoded tags and does not require manual handling to read the encoded information. After tagging, the piece of luggage 124 is placed on the baggage conveyor 110. When the piece of luggage 124 enters the explosive detection system 112, the piece of luggage 124 also enters the secure area 108. Only a minimum number of authorized personnel are allowed inside the secure area 108 to minimize the risk of mishandling the piece of luggage 124.

After the piece of luggage 124 exits the explosive detection system 112, the piece of luggage 124 may be subjected to a manual inspection at the baggage inspection station 114 by an inspection officer and placed back on the baggage conveyor 110. As the piece of luggage 124 passes through the scanning station 116, the length, width, and height dimensions of the piece of luggage 124 are measured, for example, by optical sensors according to well-known techniques. The dimensions of the piece of luggage 124 are transmitted to the wrapping station 118, where the piece of luggage 124 is wrapped in a sheet of flexible film. The flexible film may be, for example, heat shrink film having a suitable thickness for withstanding baggage handling.

The flexible film is then sealed at the sealing station 120. The sealing station 120 may optionally include dies for forming one or more handles in a portion of the flexible film extending from the piece of luggage 124. A label is printed on the exterior of the wrapped piece of luggage 124 that includes the passenger and baggage routing information on the RFID tag 106. In embodiments where heat shrink is desired, the heating station 122 may be included after the sealing station 120 to ensure that excess film does not snag in the baggage conveyor 110 or in other baggage handling equipment and to improve the appearance of the wrapped piece of luggage 124. The baggage conveyor 110 carries the piece of luggage to a baggage receiving station or baggage make/up area. If the wrapped piece of luggage 124 is tampered with from this point on, the unsealed wrapping may readily be seen, and appropriate action may be initiated quickly. Although an airport is used in this example, other transportation systems may also benefit from the baggage security system described above.

In another embodiment, the piece of luggage 124 is only wrapped when required by security regulations that apply to certain destinations or when requested by a passenger for a fee that may be added into the ticket purchase or paid at the baggage check-in station 102 where the RFID tag 106 is issued. The RFID tag 106 indicates whether the piece of luggage 124 is to be wrapped. If no RFID tag 106 is detected, or if wrapping is not required by security regulations and if wrapping is not requested by the passenger, then the piece of luggage 124 is conveyed on the baggage conveyor 110 through the wrapping station 118 without being wrapped to a baggage receiving station. The optional wrapping service advantageously reduces the risk to the passenger of loss of luggage contents and also protects the piece of luggage 124 from scuffing, water damage, and other hazards of baggage handling.

If any of the baggage security system stations should fail, the baggage conveyor 110 can continue to move luggage to the baggage receiving station in the same manner as without the baggage security system until the defective station is repaired or replaced to provide uninterrupted baggage handling.

In one embodiment, an apparatus for avoiding tampering of luggage includes:
 a tag encoder unit for recording passenger and routing information onto an identification tag and for dispensing the identification tag for attaching to a piece of luggage at a baggage check-in station;
 a baggage conveyor for receiving the piece of luggage at the baggage check-in station and for conveying the piece of luggage from the baggage check-in station through a secure area that excludes all unauthorized personnel;
 a scanning station for scanning the piece of luggage to detect and decode the identification tag and to measure dimensions of the piece of luggage; and
 a wrapping station for wrapping the piece of luggage automatically and for conveying the piece of luggage through the wrapping station without wrapping the piece of luggage.

Figure 2:
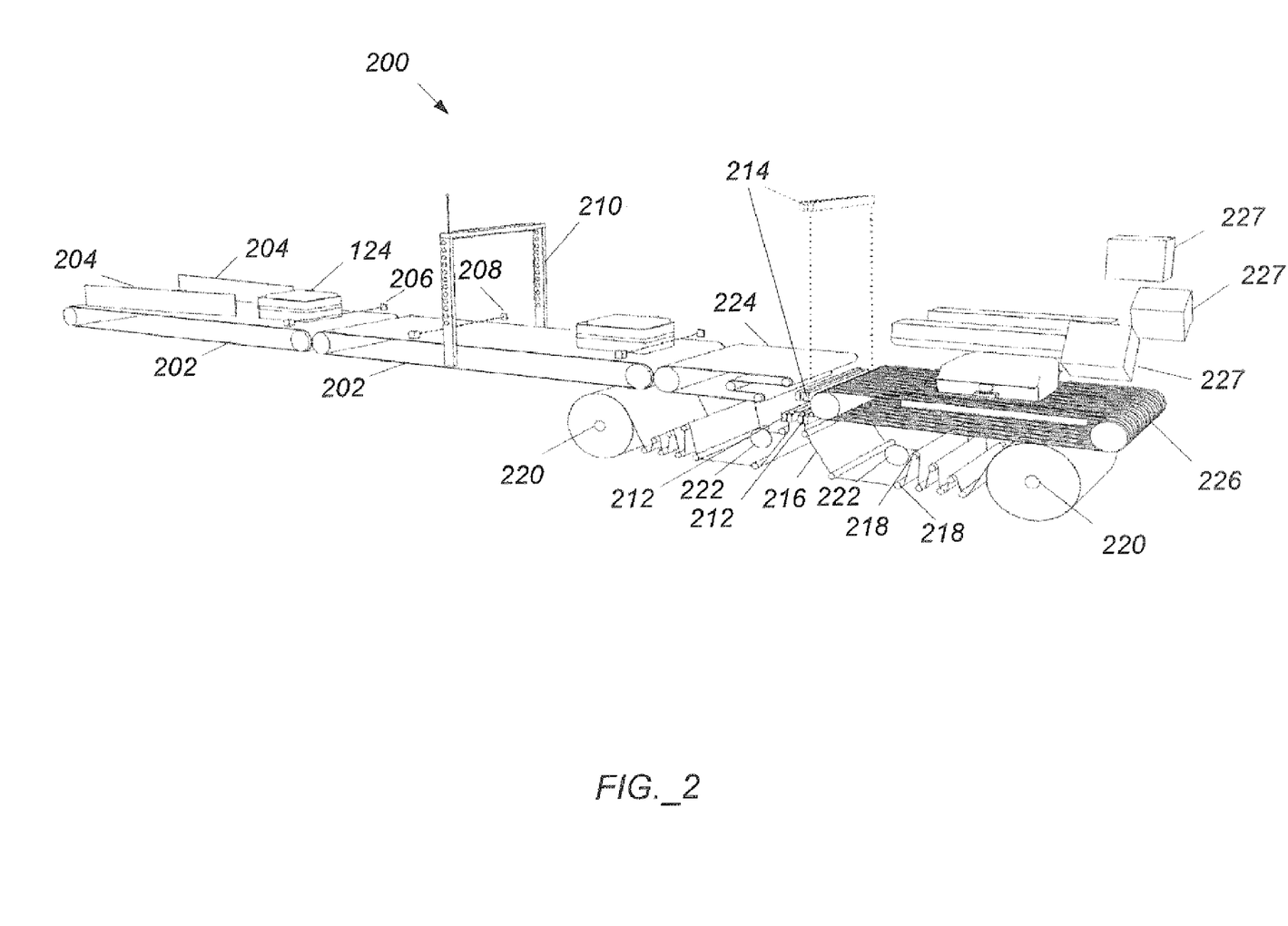
FIG. 2 illustrates a perspective view of a luggage wrapping machine for the baggage security system of FIG. 1.

FIG. 2 illustrates a perspective view 200 of a luggage wrapping machine for the baggage security system of FIG. 1. Shown in FIG. 2 are a piece of luggage 124, baggage conveyor sections 202, luggage centering arms 204, sensors 206, 208, and 210, film retainer bars 212, gripper bars 214, a sheet of flexible film 216, dancer bars 218, film spindles 220, perforation wheels 222, a transpositor conveyor 224, a sealer conveyor 226, and label applicators 227.

The luggage centering arms 204 guide the piece of luggage to the center of the baggage conveyor sections 202 and align the piece of luggage 124 so that the longest dimension of the piece of luggage 124 is parallel to the direction of motion along the baggage conveyor sections 202, and the shortest dimension of the piece of luggage 124 is vertical with respect to the surface of the baggage conveyor sections 202. The sensor 206 detects the position of the piece of luggage 124 and stops the first baggage conveyor section 202 if required to maintain the correct distance between each piece of luggage 124.

In an embodiment using the RFID tag 106, a signal from the RFID tag 106 on the piece of luggage 124 is received by an RFID antenna on the sensor 210. The signal indicates whether the piece of luggage 124 is to be wrapped. The sensors 208 and 210 sense the length, width, and height dimensions of the piece of luggage 124.

Figure 3:
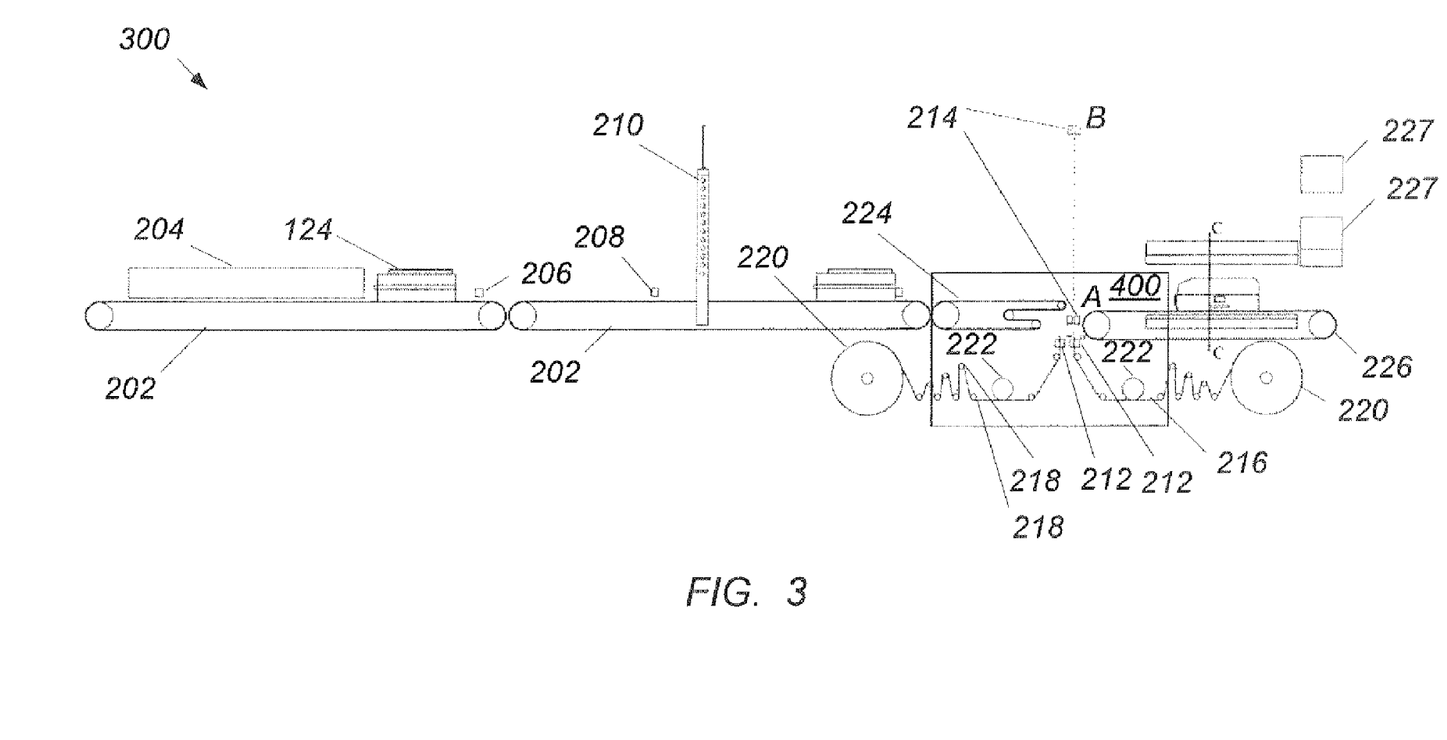
FIG. 3 illustrates a side view of the luggage wrapping machine of FIG. 2.

FIG. 3 illustrates a side view 300 of the luggage wrapping machine of FIG. 2. Shown in FIG. 3 are a piece of luggage 124, baggage conveyor sections 202, luggage centering arms 204, sensors 206, 208, and 210, film retainer bars 212, gripper bars 214, a sheet of flexible film 216, dancer bars 218, film spindles 220, perforation wheels 222, a transpositor conveyor 224, and a sealer conveyor 226.

The film retainer bars 212 hold the sheet of flexible film 216 in position for gripping by the gripper bars 214. If the piece of luggage 124 is to be wrapped, the gripper bars 214 draw the sheet of flexible film 216 from position "A" toward position "B" through a gap between the transpositor conveyor 224 and a sealer conveyor 226. The sheet of flexible film 216 is pulled from one of the spindles 220 across the perforation wheels 222 and the dancer bars 218 to position "B" above and in front of the approaching piece of luggage 124. The height of position "B" and the corresponding length of the sheet of flexible film 216 sufficient to enclose the piece of luggage 124 is determined from the dimensions of the piece of luggage 124 measured by the sensors 208 and 210. The remaining supply of flexible film on each of the spindles 220 is sensed according to well-known techniques. If the selected spindle 220 lacks a sufficient supply of flexible film to wrap the piece of luggage 124, a sensor will signal the film retainer bars 212 over the selected spindle 220 to move out of position below the gripper bars 214, and the alternate pair of film retainer bars 212 over the alternate spindle 220 will move into position below the gripper bars 214. This feature allows the wrapping cycle to continue without interruption while the depleted spindle 220 is reloaded.

The depleted spindle 220 may be reloaded as follows:
 1. Remove the residual film roll from the path between the spindle 220 and the film retainer bars 212.
 2. Using an appropriate device, for example, a hand truck, position a new roll of film on the spindle 220.
 3. Thread the film over the dancer bars 218 and across the perforation wheel 222.
 4. Open the film retainer bars 212 over the reloaded spindle 220.
 5. Insert the film end between the film retainer bars 212 and position the edge of the film beyond the film retainer bars 212 so that the film may be gripped by the gripper bars 214.
 6. Close the film retainer bars 212. The reloaded spindle 220 is ready for use.

Figure 4:
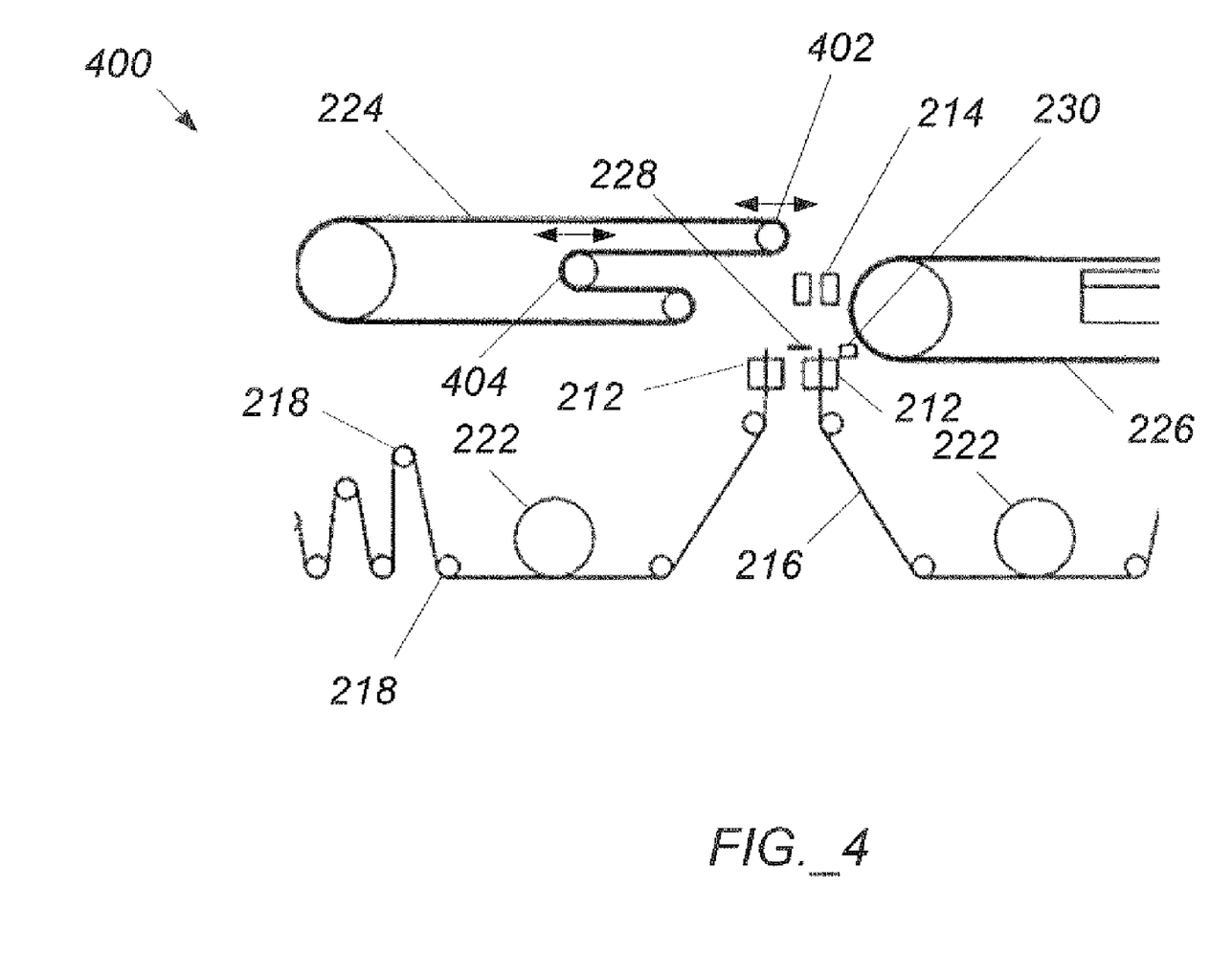
FIG. 4 illustrates an enlarged side view of a portion of the luggage wrapping machine of FIG. 3.

FIG. 4 illustrates an enlarged side view 400 of a portion of the luggage wrapping machine of FIG. 3. Shown in FIG. 4 are film retainer bars 212, gripper bars 214, a sheet of flexible film 216, dancer bars 218, perforation wheels 222, a transpositor conveyor 224, a sealer conveyor 226, a sheet cutter 228, a sealing bar 230, an extending roller 402, and a tension roller 404.

As the piece of luggage 124 approaches the wrapping station 118 in FIG. 1, the extending roller 402 moves to the left to clear an opening above the gripper bars 214. The tension roller 404 moves in unison with the extending roller 402 to maintain constant belt tension as the length of the transpositor conveyor 224 changes.

FIGS. 5, 6, 6A, 7, 8, 9, and 10 illustrate the sequence of operations performed by the luggage wrapping machine of FIG. 3. Shown in FIGS. 5-10 are a piece of luggage 124, film retainer bars 212, gripper bars 214, a sheet of flexible film 216, a transpositor conveyor 224, a sealer conveyor 226, a sheet cutter 228, and a sealing bar 230.

Figures 5, 6:
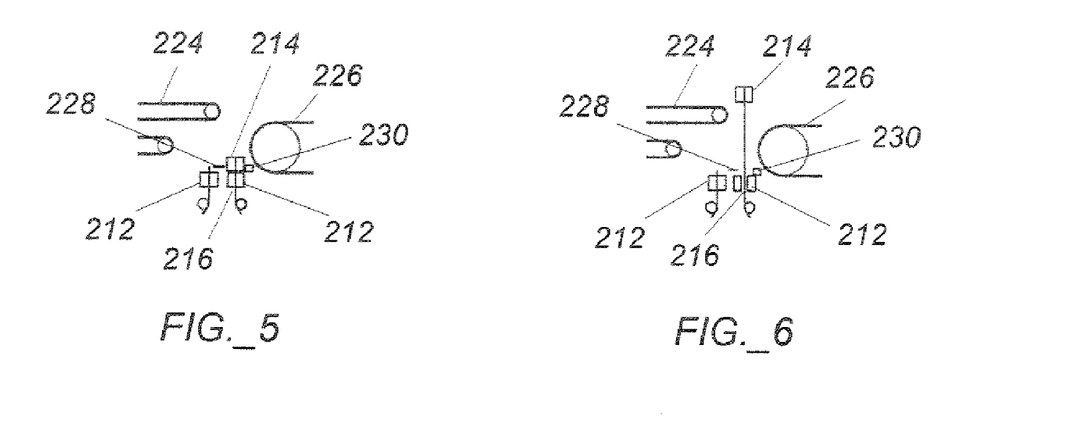
FIGS. 5, 6, 6A, 7, 8, 9, and 10 illustrate the sequence of operations performed by the luggage wrapping machine of FIG. 3.

In FIG. 5, the gripper bars 214 grip the sheet of flexible film 216, and the film retainer bars 212 open.

In FIG. 6, the gripper bars 214 move upward toward position B in FIG. 3, pulling the sheet of flexible film 216 above and in front of the piece of luggage 124. The tension on the sheet of film 216 pulls the dancer bars 218 in FIG. 4 closer together. A sensor (not shown) on the dancer bars 218 signals the spindle 220 under the gripper bars 214 to release braking to feed the sheet of flexible film 216 from a continuous supply roll on the spindle 220. As the sheet of flexible film 216 exits the dancer bars 218, the perforation wheel 222 perforates the sheet of flexible film 216, forming a tear strip in the sheet of flexible film 216 to facilitate its removal when the piece of luggage 124 arrives at its destination, where the passenger may remove the sheet of flexible film 216 and discard it into a recycling container.

The sheet of flexible film 216 is pulled vertically to a length based on the dimensions of the piece of luggage 124 received from the sensors 208 and 210 in FIG. 3. As the movement of the gripper bars 214 slows and stops at position "B", the dancer bars 218 in FIG. 3 move apart. The separation of the dancer bars 218 is sensed by the sensor (not shown) on the dancer bars 218, signaling the spindle 220 to brake.

Figure 6A:
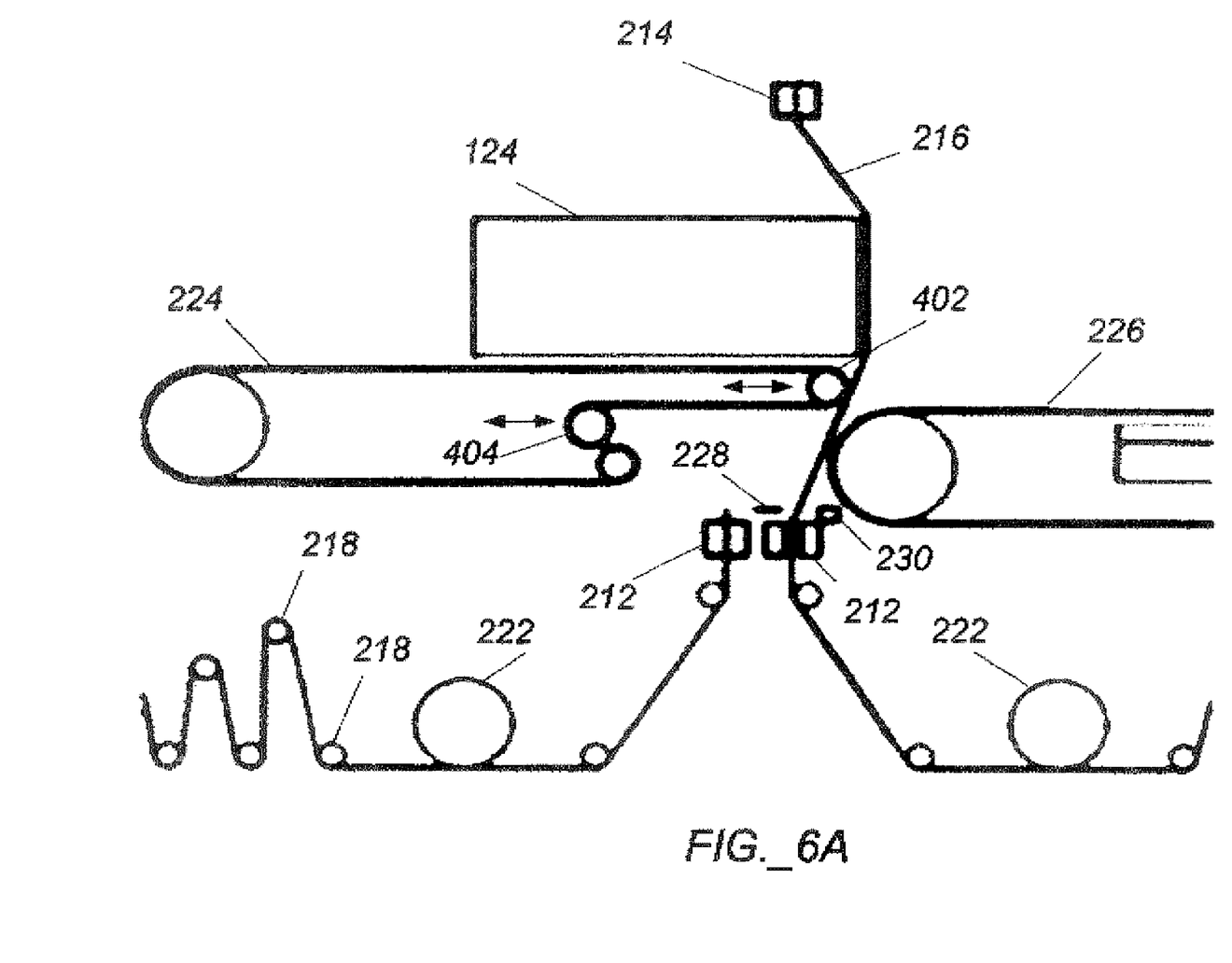

In FIG. 6A, the extending roller 402 of the transpositor conveyor 224 moves toward the right to cover the opening vacated by the gripper bars 214, pushing the piece of luggage 124 into the sheet of film 216 and onto the sealing conveyor 226, for example, by friction between the piece of luggage 124 and the surfaces of the transpositor conveyor 224 and the sealer conveyor 226. The motion of the piece of luggage 124 extends the sheet of film 216 up over the leading end, across the top, and over the trailing end of the piece of luggage 124.

Figures 7, 8:
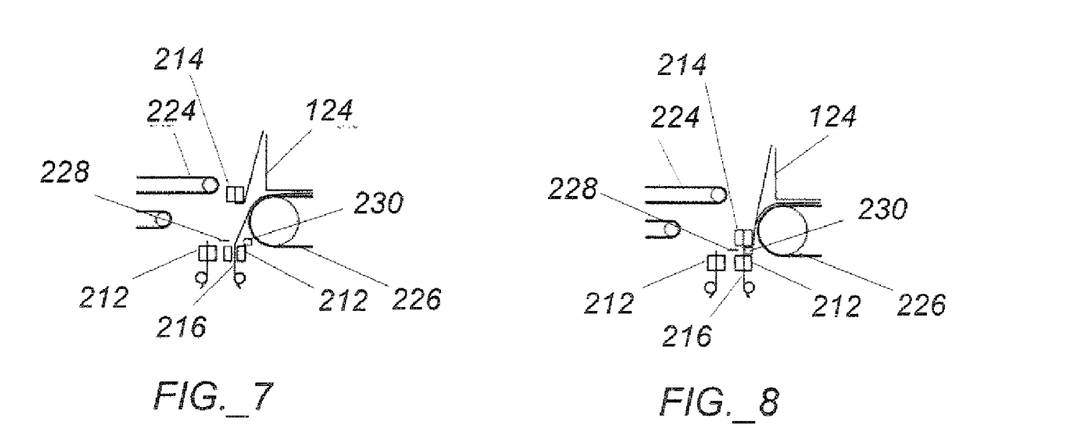

In FIG. 7, the trailing end of the piece of luggage 124 passes under the gripper bars 214, and the gripper bars 214 pull the end of the sheet of flexible film 216 from position "B" toward position "A" in FIG. 3.

In FIG. 8, the extending roller 402 (shown in FIGS. 4 and 6A only) of the transpositor conveyor 224 moves to the left as the gripper bars 214 pull the end of the film sheet 216 down over the trailing end of the piece of luggage 124 to contact the other end of the sheet of flexible film 216 held by the film retainer bars 212 at position "A". The heated sealing bar 230 moves into position below the gripper bars 214, welding the ends of the sheet of flexible film 216 together.

Figures 9, 10:
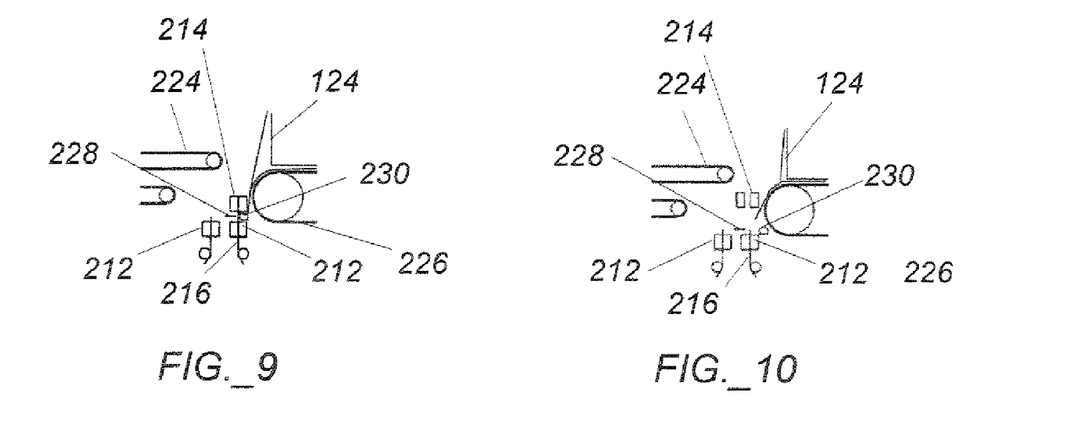

In FIG. 9, the length cutter 228 cuts the sheet of flexible film 216 outside the weld above the film retainer bars 212.

In FIG. 10, the gripper bars 214 open to release the end of the wrapped sealed film prior to the start of the next wrapping cycle. Further, the extending roller 402 of the transpositor conveyor 224 moves to the right to cover the gap over the gripper bars 214.

If the piece of luggage 124 is not to be wrapped, the gripper bars 214 and the extending roller 402 of the transpositor conveyor 224 do not move. The side sealing bars and knives also do not move as the piece of luggage 124 is conveyed from the transpositor conveyor 224 to the sealing conveyor 226 through the luggage wrapping machine. The label applicators 227 may be employed or not to suit specific applications within the scope of the appended claims.

Figure 11:
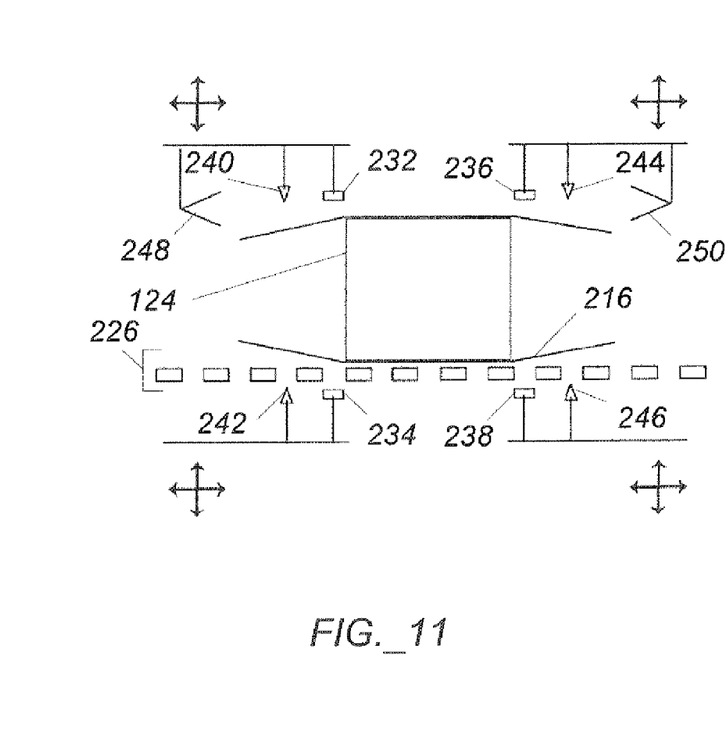
FIGS. 11 and 12 illustrate front views of the sealing operation performed by the luggage wrapping machine of FIG. 3.
Figure 12:
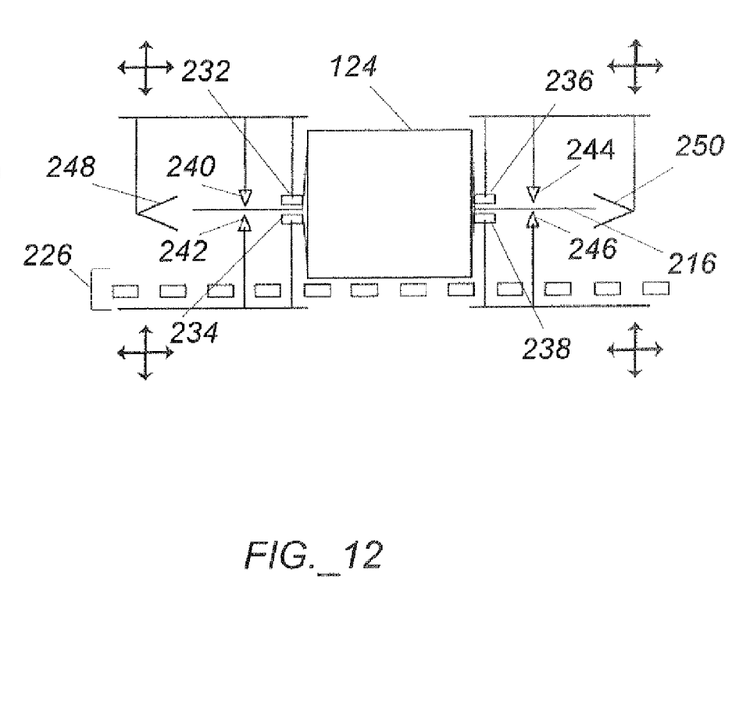

FIGS. 11 and 12 illustrate front views of the sealing operation performed by the luggage wrapping machine of FIG. 3. Shown in FIGS. 11 and 12 are a piece of luggage 124, a sheet of film 216, a sealing conveyor 226, an upper left side sealing bar 232, a lower left side sealing bar 234, an upper right side sealing bar 236, a lower right side sealing bar 238, an upper left side knife 240, a lower left side knife 242, an upper right side knife 244, a lower right side knife 246, a left side vacuum port 248, and a right side vacuum port 250.

In FIG. 11, the upper left side sealing bar 232, the lower left side sealing bar 234, the upper right side sealing bar 236, the lower right side sealing bar 238, the upper left side knife 240, the lower left side knife 242, the upper right side knife 244, and the lower right side knife 246 move into position over and under the sides of the piece of luggage 124 according to the width of the piece of luggage 124 measured by the sensor 210 in FIG. 3.

In FIG. 12, the lower left side sealing bar 234, the lower right side sealing bar 238, the lower left side knife 242, and the lower right side knife 246 extend between gaps in separate belts of the sealing conveyor 226 to meet the upper left side sealing bar 232, the upper right side sealing bar 236, the upper left side knife 240, and the upper right side knife 244 at approximately one-half the height of the piece of luggage 124. The dimensions of the piece of luggage 124 are used to position the side sealing bars 232, 234, 236, and 238 so that they contact the sheet of flexible film 216 close by the piece of luggage 124. The side sealing bars 232, 234, 236, and 238 are heated to weld the sides of the sheet of flexible film 216 together along the sides of the piece of luggage 124. The portion of the sheet of flexible film 216 extending outside the weld is removed by the side knives 240, 242, 244, and 246. The side sealing bars 232, 234, 236, and 238 and the side knives 240, 242, 244, and 246 retract to their initial positions in FIG. 11 for the next wrapping cycle, and the removed film is cleared from the sealing conveyor 226 by the side vacuum ports 248 and 250. One or more handle cutouts may optionally be formed in the portion of the sheet of flexible film 216 extending outside the weld along the sides and the trailing end of the piece of luggage 124 by dies incorporated into the side sealing bars 232, 234, 236, and 238 according to well-known techniques.

An increasing problem exits within the airline industry with respect to misdirected baggage. Misdirected baggage results from barcode scanners misreading the barcodes on the IATA tags. The barcodes may be misread because the IATA tags are damaged, because the barcodes are obscured, and because of human error in manually entering the barcode from the small printing on the IATA tag. The inclusion of the RFID tag 106 provides a much more reliable reading mechanism using an RFID scanner, and the decoded passenger and baggage routing information may be used to print large, multiple labels including the barcode. Printing large labels on the piece of luggage 124 advantageously avoids the problems that can cause scanning errors and human errors. Passengers may object to adhesive labels being applied directly to their luggage, but are less likely to object to labels placed on the outside of the film wrap. Also, the labels display information that assists passengers in distinguishing their luggage from similar and identical pieces on the same carousel.

After wrapping, the piece of luggage 124 is conveyed to the label applicators 227 in FIG. 3. The label applicators 227 print the passenger and baggage routing information from the RFID tag 106 on one or more sides of the piece of luggage 124. The labels may be printed on a separate medium, for example, an adhesive backed paper, and attached directly to the piece of luggage 124 or to the outside of the flexible sheet of film 216 that encloses the piece of luggage 124. Alternatively, the labels may be printed directly on the flexible sheet of film 216 that encloses the piece of luggage 124. The labels provide an automated positive passenger-to-baggage matching process of the wrapped and sealed piece of luggage 124. The wrapped and sealed piece of luggage 124 may optionally pass through the heating station 122 to shrink the film tightly around the piece of luggage 124.

In the various embodiments of the baggage security system described above, well-known mechanical devices such as motors and articulating arms are omitted from the description to more clearly illustrate the configuration and operation of the baggage security system.

In one embodiment, a centralized, separate computer interfaces with the airport information computer and operates the entire wrapping system according to well-known computer programming techniques.

In another embodiment, a method of protecting luggage from tampering includes the following steps:
(a) receiving a piece of luggage at a baggage check-in station;
(b) encoding passenger and routing information at the baggage check-in station onto an identification tag;
(c) attaching the identification tag to the piece of luggage;
(d) placing the piece of luggage on a baggage conveyor and conveying the piece of luggage to a security inspection station inside a secure area that excludes all unauthorized personnel;
(e) conveying the piece of luggage on the baggage conveyor to a scanning station to detect and decode the identification tag;
(f) conveying the piece of luggage on the baggage conveyor to a wrapping station;
(g) when an identification tag is detected, continuing from step (h), else continuing from step (j);
(h) when the identification tag indicates that the piece of luggage is to be wrapped, continuing from step (i), else continuing from step (j);
(i) wrapping the piece of luggage automatically; and
(j) conveying the piece of luggage through the wrapping station to a baggage receiving station.

Figure 13:
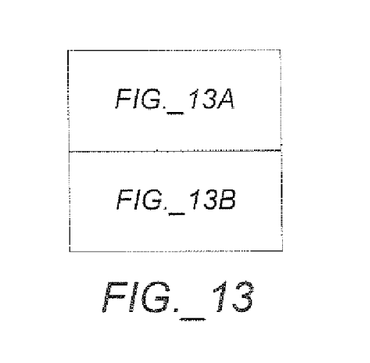
FIG. 13 illustrates a flow chart for a method of protecting luggage from tampering implemented by the luggage wrapping machine of FIG. 3.
Figure 13A:
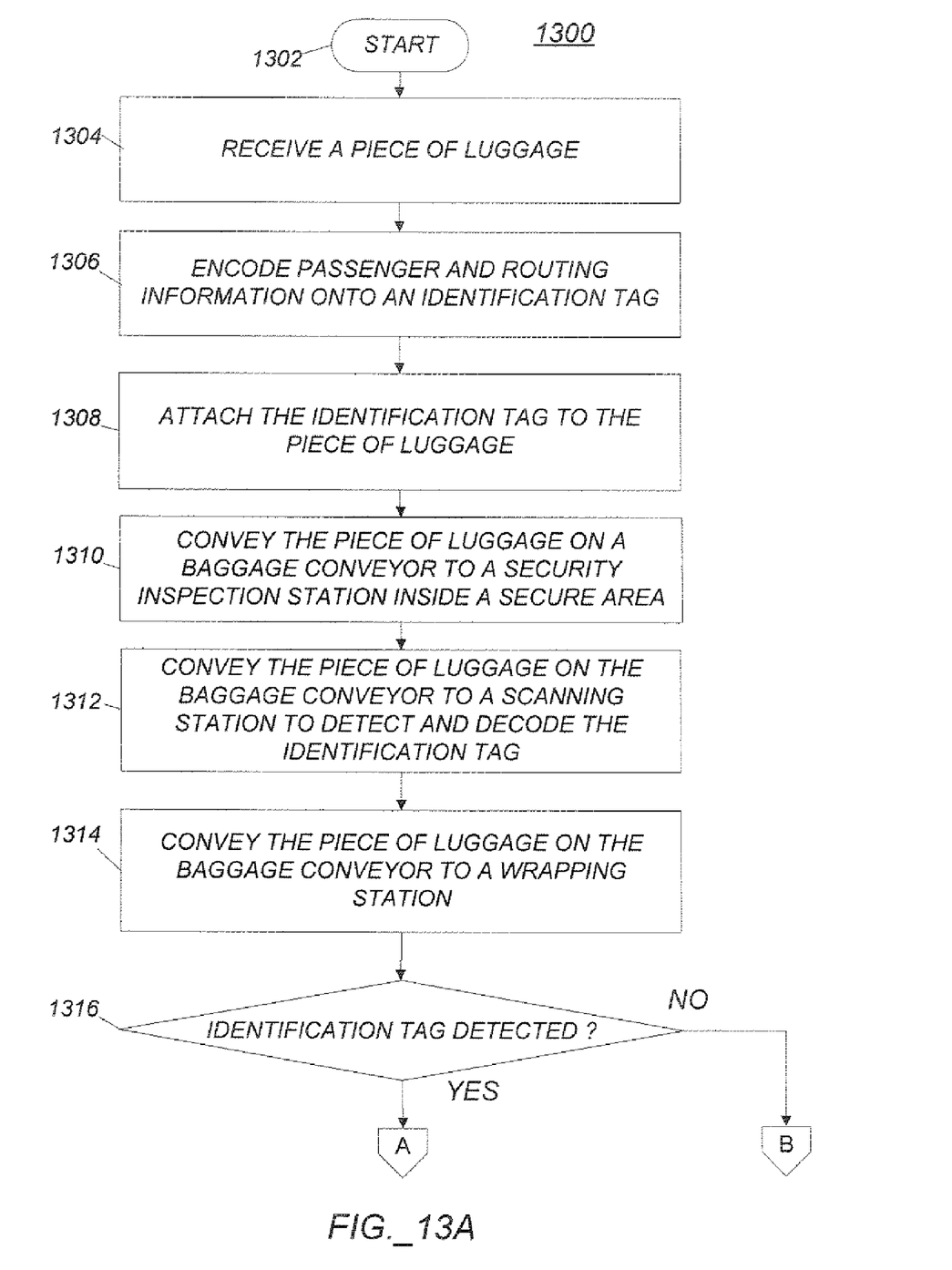
Figure 13B:
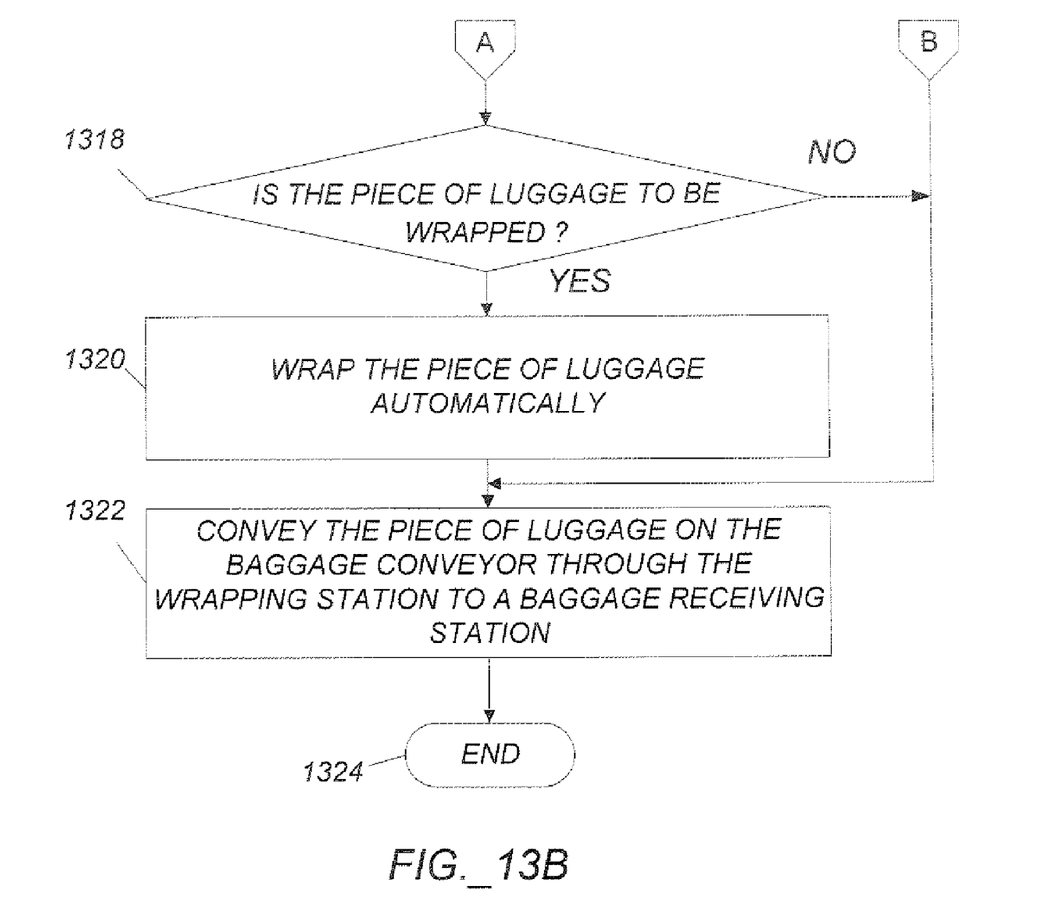

FIG. 13 illustrates a flow chart for a method of protecting luggage from tampering implemented by the luggage wrapping machine of FIG. 2.

Step 1302 is the entry point of the flow chart 1300.

In step 1304, a piece of luggage is received by a baggage check-in station.

In step 1306, passenger and routing information is encoded at the baggage check-in station onto an identification tag.

In step 1308, the identification tag is attached to the piece of luggage.

In step 1310, the piece of luggage is placed on a baggage conveyor and conveyed to a security inspection station inside a secure area that excludes all unauthorized personnel.

In step 1312, the piece of luggage is conveyed on the baggage conveyor to a scanning station to detect and decode the identification tag. The identification tag may be a modified IATA tag that includes additional information, such as a wrap/no-wrap indicator read by a bar code reader, or the identification tag may be an RFID tag read by an RFID tag decoder. Other identification tags may be used to practice various embodiments to suit specific applications within the scope of the appended claims, including combinations such as an IATA tag with an RFID tag.

In step 1314, the piece of luggage is conveyed on the baggage conveyor to a wrapping station.

In step 1316, when an identification tag is detected, the flow chart 1300 continues from step 1318. If no identification tag is detected, for example, from a misread of the identification tag or because the identification tag was omitted for any reason, the flow chart 1300 continues from step 1322.

In step 1318, when the identification tag indicates that the piece of luggage is to be wrapped, the flow chart 1300 continues from step 1320. Otherwise, the flow chart 1300 continues from step 1322.

In step 1320, the piece of luggage is wrapped automatically by the wrapping station as described above.

In step 1322, the piece of luggage is conveyed on the baggage conveyor through the wrapping station to a baggage receiving station. In this method, each piece of luggage may follow the same path on the baggage conveyor and be selectively wrapped or not wrapped.

Step 1324 is the exit point of the flow chart 1300.

Although the flowchart description above is described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The specific embodiments and applications thereof described above are for illustrative purposes only and do not preclude modifications and variations that may be made within the scope of the following claims.

What is claimed is:

1. A method of protecting luggage from tampering comprising the following steps:
   (a) receiving a piece of luggage at a baggage check-in station;
   (b) encoding passenger and routing information at the baggage check-in station onto an identification tag;
   (c) attaching the identification tag to the piece of luggage;
   (d) placing the piece of luggage on a baggage conveyor and conveying the piece of luggage to a security inspection station inside a secure area that excludes all unauthorized personnel;
   (e) conveying the piece of luggage on the baggage conveyor to a scanning station to detect and decode the identification tag;
   (f) conveying the piece of luggage on the baggage conveyor to a wrapping station;
   (g) when an identification tag is detected, continuing from step (h), else continuing from step (j);
   (h) when the identification tag indicates that the piece of luggage is to be wrapped, continuing from step (i), else continuing from step (j);
   (i) wrapping the piece of luggage automatically; and
   (j) conveying the piece of luggage through the wrapping station to a baggage receiving station.

2. The method of claim 1 further comprising a step of printing the passenger and routing information on the piece of luggage.

3. The method of claim 1, the step of wrapping the piece of luggage comprising the following steps:
   measuring dimensions of the piece of luggage to determine a length of a sheet of flexible film sufficient to enclose the piece of luggage;
   drawing the sheet of flexible film around the piece of luggage; and
   sealing the sheet of flexible film around the piece of luggage to wrap the piece of luggage inside the sheet of flexible film.

4. The method of claim 2 further comprising a step of printing the passenger and routing information on multiple sides of the piece of luggage.

5. The method of claim 3 further comprising a step of forming a series of perforations in the sheet of flexible film to facilitate its subsequent removal.

6. The method of claim 5 further comprising a step of removing the sheet of flexible film along the series of perforations.

7. The method of claim 6 further comprising a step of discarding the sheet of flexible film in a recycling container.

8. The method of claim 3 further comprising a step of forming at least one handle in a portion of the sheet of flexible film extending from the piece of luggage.

9. The method of claim 3 further comprising a step of dispensing the sheet of flexible film from a continuous roll.

10. The method of claim 9 further comprising steps of dispensing the sheet of flexible film from a first spindle and automatically switching to a second spindle for dispensing the sheet of flexible film from the second spindle when the first spindle lacks a supply of flexible film sufficient to wrap the piece of luggage.

11. The method of claim 1 further comprising a step of incorporating an RFID tag in the identification tag.

12. The method of claim 1 further comprising a step of heating the wrapped piece of luggage to shrink the flexible film around the piece of luggage.

13. An apparatus for protecting luggage from tampering comprising:
   a tag encoder unit for recording passenger and routing information onto an identification tag and for dispensing the identification tag for attaching to a piece of luggage at a baggage check-in station;
   a baggage conveyor for receiving the piece of luggage at the baggage check-in station and for conveying the piece of luggage from the baggage check-in station through a secure area that excludes all unauthorized personnel;
   a scanning station for scanning the piece of luggage to detect and decode the identification tag and to measure dimensions of the piece of luggage; and
   a wrapping station for wrapping the piece of luggage automatically and for conveying the piece of luggage through the wrapping station without wrapping the piece of luggage.

14. The apparatus of claim 13, the wrapping station comprising gripper bars for drawing a sheet of flexible film around the piece of luggage, the flexible film having a length determined from the dimensions of the piece of luggage received from the scanning station.

15. The apparatus of claim 14, the wrapping station further comprising sealing bars for sealing the sheet of flexible film around the piece of luggage.

16. The apparatus of claim 13, further comprising a label applicator for printing the passenger and routing information on the piece of luggage.

17. The apparatus of claim 13 further comprising a perforator for forming a series of perforations in the sheet of flexible film to facilitate its removal.

18. The apparatus of claim 17 further comprising a recycling container for discarding the sheet of flexible film when it is removed from the piece of luggage.

19. The apparatus of claim 14 further comprising a die for forming at least one handle cutout in a portion of the flexible film extending from the piece of luggage.

20. The apparatus of claim 14 further comprising a mechanism for dispensing the sheet of flexible film from a first spindle and automatically switching to a second spindle for dispensing the sheet of flexible film from the second spindle when the first spindle lacks a length of flexible film sufficient to wrap the piece of luggage.

21. The apparatus of claim 14 further comprising a mechanism for dispensing the sheet of flexible film from a continuous roll.

22. The apparatus of claim 13 comprising a tag encoder unit that records passenger and routing information onto an identification tag comprising an RFID tag.

23. The apparatus of claim 14 further comprising a heating station for shrinking the sheet of flexible film around the piece of luggage.

* * * * *